US011314725B2

(12) United States Patent
Jain et al.

(10) Patent No.: US 11,314,725 B2
(45) Date of Patent: Apr. 26, 2022

(54) INTEGRATED REVIEW AND REVISION OF DIGITAL CONTENT

(71) Applicant: Adobe Inc., San Jose, CA (US)

(72) Inventors: Ajay Jain, Ghaziabad (IN); Sanjeev Tagra, Haryana (IN); Nitish Maurya, Noida (IN); Sachin Soni, New Delhi (IN); Abhishek Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 6 days.

(21) Appl. No.: 16/941,291

(22) Filed: Jul. 28, 2020

(65) Prior Publication Data

US 2022/0035789 A1 Feb. 3, 2022

(51) Int. Cl.
| | | |
|---|---|---|
| G06F 17/00 | (2019.01) | |
| G06F 16/23 | (2019.01) | |
| G06N 20/00 | (2019.01) | |
| G06F 3/04847 | (2022.01) | |
| G06F 40/166 | (2020.01) | |
| G06F 40/289 | (2020.01) | |
| G06N 5/04 | (2006.01) | |

(52) U.S. Cl.
CPC ...... *G06F 16/2365* (2019.01); *G06F 3/04847* (2013.01); *G06F 40/166* (2020.01); *G06F 40/289* (2020.01); *G06N 5/04* (2013.01); *G06N 20/00* (2019.01); *G06F 17/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,938,679 B1* | 1/2015 | Hsu | ............... | G06F 40/169 |
| | | | | 715/751 |
| 9,852,215 B1* | 12/2017 | Sullivan | ............... | G06F 16/36 |
| 2018/0285326 A1* | 10/2018 | Goyal | ............... | G06F 40/197 |
| 2021/0224306 A1* | 7/2021 | Choudhary | ............ | G06N 5/04 |

OTHER PUBLICATIONS

Grammarly, "Grammarly Check", https://www.grammarly.com/grammar-check, 2009, accessed Jul. 27, 2020, 7 pages.
Google, "Google Docs: Free Online Documents for Personal Use", https://www.google.com/docs/about/, 2006, accessed Jul. 27, 2020, 9 pages.
Microsoft, "Track Changes in Word—Office Support", https://support.microsoft.com/en-us/office/track-changes-in-word-197ba630-0f5f-4a8e-9a77-3712475e806a#:~:text-Review%2C, 2020, accessed Jul. 27, 2020, 12 pages.

* cited by examiner

*Primary Examiner* — Quoc A Tran

(57) ABSTRACT

In some embodiments, a review application accesses a review file containing a text-based comment describing a change to an object in a design file. The design file is created and editable in a design application different from the review application. The review application determines, from the text-based comment, a tool in the design application configured to implement the change to the object described in the text-based comment. The review application updates the user interface to include a user interface of the tool along with the text-based comment and receives, through the user interface of the tool, a confirmation of applying the change to the object in the design file. The review application further causes the change to the object to be applied to the design file.

20 Claims, 10 Drawing Sheets

INTEGRATED REVIEW AND REVISION OF DIGITAL CONTENT

TECHNICAL FIELD

This disclosure relates generally to computer-implemented methods and systems for digital content processing. Specifically, the present disclosure involves facilitating digital content revision based on text-based comments presented in a review application.

BACKGROUND

Digital content is often created by a designer using a design application that is different from the application used by a reviewer to review and comment on the digital content, referred to as a "review application." For example, a designer may use a design application, such as Adobe Photoshop®, to design a poster image. The design application stores the poster image in a design file, such as a Photoshop Document ("PSD"), that cannot be opened by a reviewer without installing the design application on the reviewer's computing device. In addition, some design application does not provide the functionalities to allow a reviewer to add comments to the design file. As such, the designer may convert or render the design file into a review file having a file format, such as a Portable Document Format ("PDF"), that can be viewed and commented on by the reviewer using a review application, such as the Adobe Acrobat®, without using the design application. For instance, the reviewer could add comments to the review file suggesting changes to the digital content, and return the commented review file to the designer.

In this example, revising the design based on the commented review file could be particularly cumbersome. For instance, the designer must launch the design application, open the design file for the digital content, and find the right tool in the design application to implement the changes suggested in the comments. If the review file includes multiple comments requiring actions by different tools in the design application, the designer must repeatedly switch between the review application and the design application to ensure all the changes are implemented in the design file. This process is time-consuming and error-prone, and significantly delays the design process.

SUMMARY

Certain embodiments involve integrating tools of a design application into a review application for a digital file to enable changes to the digital file through the review application. In one example, a review application accesses a review file containing a text-based comment describing a change to an object in a design file. The design file is created and editable in a design application different from the review application. From the text-based comment, the review application determines a tool in the design application configured to implement the change to the object described in the text-based comment and updates the user interface of the review application to include a user interface of the tool along with the text-based comment. Through the user interface of the tool, the review application receives a confirmation of applying the change to the object in the design file and causes the change to the object to be applied to the design file.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 depicts an example of a user interface of a review application for presenting a review file, the associated comments, and a tool identified for a comment, according to certain embodiments of the present disclosure.

FIG. 7 depicts another example of a user interface of a review application for presenting a review file, the associated comments, and a tool identified for a comment, according to certain embodiments of the present disclosure.

DETAILED DESCRIPTION

Figure 1:
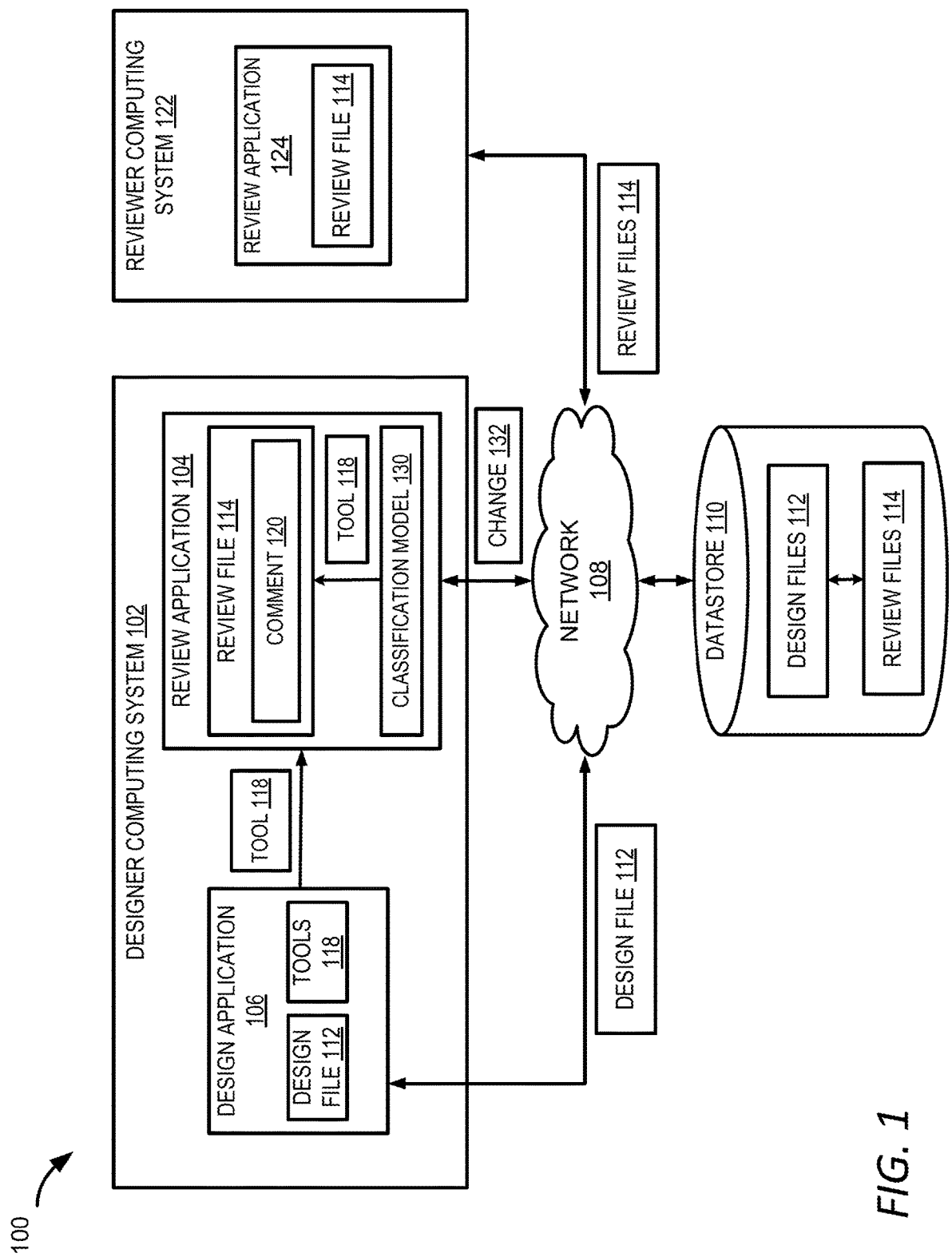
FIG. 1 depicts an example of a computing environment for integrating tools of a design application into a review application for a design file to enable changes to the design file through the review application, according to certain embodiments of the present disclosure.

The present disclosure involves integrating design tools of a design application into a review application for presenting a review file of a design file to enable changes to the design file through the review application. The review file contains one or more text-based comments suggesting changes to be made to one or more objects of the design file. To enable an object of the design file to be changed according to the comments, the review application analyzes a text-based comment associated with the object to determine a design tool in the design application used for making the suggested change. The review application presents the design tool in the review application along with the text-comment so that the designer of the design file can implement the change within the review application. The change made through the review application is used to update the design file accordingly.

The following non-limiting example is provided to introduce certain embodiments. In this example, a review application accesses a review file of a design file, such as a webpage, a digital magazine, or a digital poster. The design file is generated using a design application that is different from the review application. The review file can be generated by rendering the design file to a format that can be opened by the review application. For example, the design file may be a PSD file created and edited using Adobe Photoshop® and the review file may be a PDF file generated by rendering or converting the PSD file to the PDF file, thereby allowing the design file to be viewed using Adobe Acrobat® as the review application. As such, each object contained in the review file has a corresponding object in the design file.

In some examples, the review file contains comments describing changes to be made to the objects in the review file (thus the corresponding objects in the design file). The review application determines a tool in the design application that can be used to implement the change described in a given comment. For instance, the review application parses the text in the comment into terms, such as single words and bigrams. The review application generates a feature vector that represents one or more of the terms. The review application applies a classification model (e.g., a linear regression model) to the feature vector and thereby identifies a tool that is suitable for implementing the comment. For instance, if a comment states "change the transparency of the image to 30%," the classification model could determine, from a feature vector representing terms of the comment, that an image transparency tool should be used to edit the design file in accordance with the comment. The review application updates a user interface of the review application to include, adjacent to the comment, an interface element for activating the tool.

Continuing with this example, the designer of the design file uses the interface element within the review application to activate the tool and thereby implement the change described in the comment within the review application. For instance, if a review comment requests the color of a button in the design file to be changed, the review application presents a user interface that presents the review comment adjacent to an interface element for activating the color tool. This allows the designer to change the color of the button within the review application without using the design application. The changes made within the review application can be applied to the design file by the review application or through another computing system. As a result, the design file can be revised according to the review comments without the designer launching the design application.

As described herein, certain embodiments provide improvements in digital content processing by enabling a more efficient designing process. Tools required to change the design files are identified from the comments, retrieved from the design application, and loaded in the review application. In this way, changes to the design files as specified in the review comments can be implemented within the review application where the review comments are being viewed. This eliminates the need of launching the design application and loading the design file, thereby reducing the time needed to revise the design file, improving the efficiency of the entire design process, and also reducing the computational operations involved in the process of implementing the changes as specified in the comments.

Certain embodiments also provide improvements to the functionality of a computing system by presenting, in the review application, a unified user interface that presents a comment describing a certain edit along with an interface element for activating a tool from a separate application to implement the described edit. This unified user interface allows a user of the computing system to access the functionality of the design application directly from the review application without having to switch between two different applications (e.g., the review application and the design application) or to open the design application. Thus, embodiments involving this unified user interface provide improved efficiency and utility as compared to existing computing techniques, which often require a user to search different applications and repeatedly switch views to locate the appropriate software tool for implementing a change to a document.

Example Operating Environment

Referring now to the drawings, FIG. 1 depicts an example of a computing environment 100 for integrating tools of a design application into a review application for a design file to enable changes to the design file through the review application. The computing environment 100 includes a designer computing system 102, which includes one or more processing devices configured to execute a review application 104 for presenting a review file 114 generated from a design file 112. The one or more processing devices of the designer computing system 102 are further configured to execute a design application 106. The design application 106 may be executed on the same computing device as the review application 104 or be executed on a different computing device than the review application 104 and communicate with the review application 104 through a network. The design application 106 can be utilized by a designer to create or edit the design file 112, for example, using various tools 118 of the design application 106. A design file 112 can include multiple objects, and each object can be a text object or a visual object (e.g., an image or a button).

The computing environment 100 further includes a datastore 110 for storing data used in the design process, such as design files 112 created and edited by designers and review files 114 generated from the respective design files 112. The design files 112 can be created using the design application 106 and saved in the datastore 110. For a given design file 112, its corresponding review file 114 can be generated by rendering the design file 112 to a format that can be opened by the review application 104. For example, the design file is a PSD file created and edited using Adobe Photoshop® as the design application 106. The review file is a PDF file generated by rendering or converting the PSD file to the PDF file so that it can be opened using Adobe Acrobat® as the review application 104. As such, each object contained in the review file 114 has a corresponding object in the design file 112.

The computing environment 100 further includes a reviewer computing system 122, which includes one or more processing devices configured to execute the review application 104. Through the review application 104 executed on the reviewer computing system 122, a reviewer of the design file 112 can view the review file 114 and add comments 120 to the review file 114. The review application 104 on the reviewer computing system 122 obtains the review file 114 by retrieving it from the datastore 110. The review file 114 containing comments 120 added by the reviewer is sent back to the datastore 110.

The designer of the design file 112 views the comments added to the design file 112 by launching the review application 104 on the designer computing system 102. The review application 104 retrieves the commented review file 114 from the datastore 110 and present the comments 120 contained in the review file 114 in the user interface of the review application 104. In some scenarios, a comment 120 includes a description of a change made to an object of the design file 112. To facilitate such a change, the review application 104 analyzes the comment 120 to determine the terms (e.g., words and/or phrases) contained in the comment 120. The review application 104 generates a feature vector representing the comment 120 by including the properties of the terms contained in comments such as the frequency of the respective terms. Such a feature vector is then fed to a classification model 130 trained for predicting a tool 118 associated with an input feature vector. The classification model 130 can be, for example, a linear regression model or any other type of prediction model that is trained to predict a tool based on an input feature vector. Additional details regarding predicting the tool 118 based on the comment 120 are provided below with regard to FIGS. 2 and 5.

The review application 104 further communicates with the design application 106 or a computing device hosting the design application 106 to retrieve the package of the tool 118 predicted by the classification model 130. The package of the tool 118 includes, for example, the software code configured to implement the functionality of the tool 118 and the user interface (UI) files used to present the tool 118. The review application 104 presents the UI of the tool 118 in the user interface of the review application 104 in conjunction with the comment 120. As a result, the designer can operate the tool 118 inside the review application 104 to implement the change to the design file 112 as specified in the comment 120. The change 132 made to the design file 112 is sent to the datastore 110 to update the design file 112. Alternatively, or additionally, the review application 104 sends the updated design file 112 to the datastore 110 to update the design file 112 stored thereupon.

In some examples, the review application 104 and the design application 106 in the designer computing system 102 and the review application 104 in the reviewer computing system 122 communicate with the datastore 110 through a network 108. The network 108 may be a local-area network ("LAN"), a wide-area network ("WAN"), the Internet, or any other networking topology known in the art that connects the datastore 110 (or the server configured to manage the datastore 110) to the designer computing system 102 and the reviewer computing system 122. Additional details regarding integrating tools of a design application into a review application are described herein with regard to FIGS. 2-8.

Figure 2:
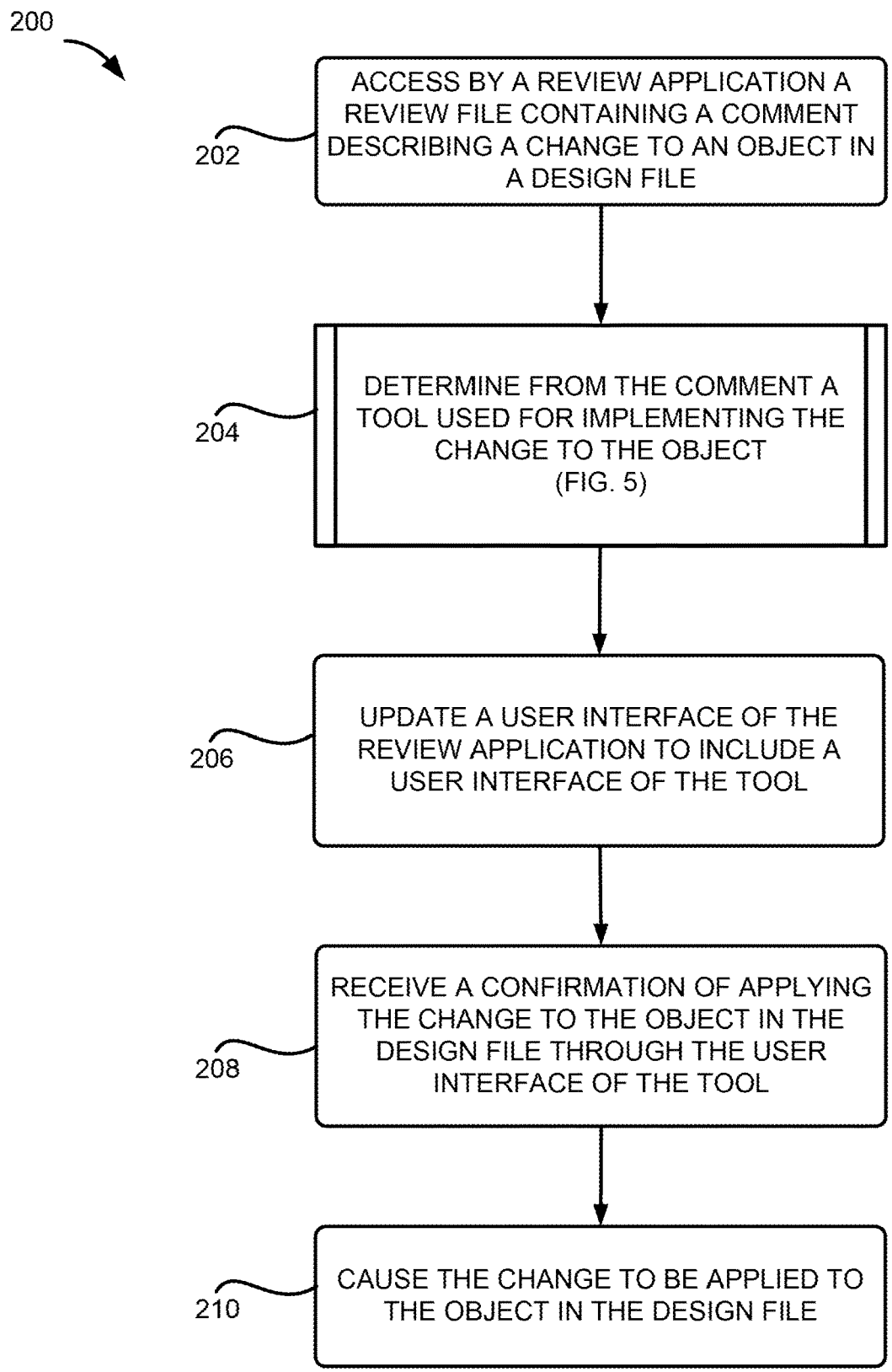
FIG. 2 depicts an example of a process for integrating a design tool of a design application into a review application for a design file to enable changes to the design file to be made through the review application, according to certain embodiments of the present disclosure.

Examples of Computer-Implemented Operations for Integrating Tools of a Design Application into a Review Application FIG. 2 depicts an example of a process 200 for integrating a design tool of a design application into a review application for a design file to enable changes to the design file through the review application. FIG. 2 is described in conjunction with FIG. 3 where an example of a user interface of a review application for presenting a review file and the associated comments is depicted and FIG. 4 where the user interface shown in FIG. 3 after incorporating a tool identified based on a comment is depicted. One or more computing devices (e.g., the designer computing system 102) implement operations depicted in FIG. 2 by executing suitable program code (e.g., the review application 104). For illustrative purposes, the process 200 is described with reference to certain examples depicted in the figures. Other implementations, however, are possible.

At block 202, the process 200 involves accessing, by the review application 104 executing on the designer computing system 102, a review file 114 containing a comment 120. The review file 114 corresponds to a design file 112 and can be generated by rendering or converting the design file 112 to a format supported by the review application 104. The design file 112 contains multiple objects and each object has a corresponding object in the review file 114. The comment 120 contained in the review file 114 describes a change to an object in the design file 112.

Figure 3:
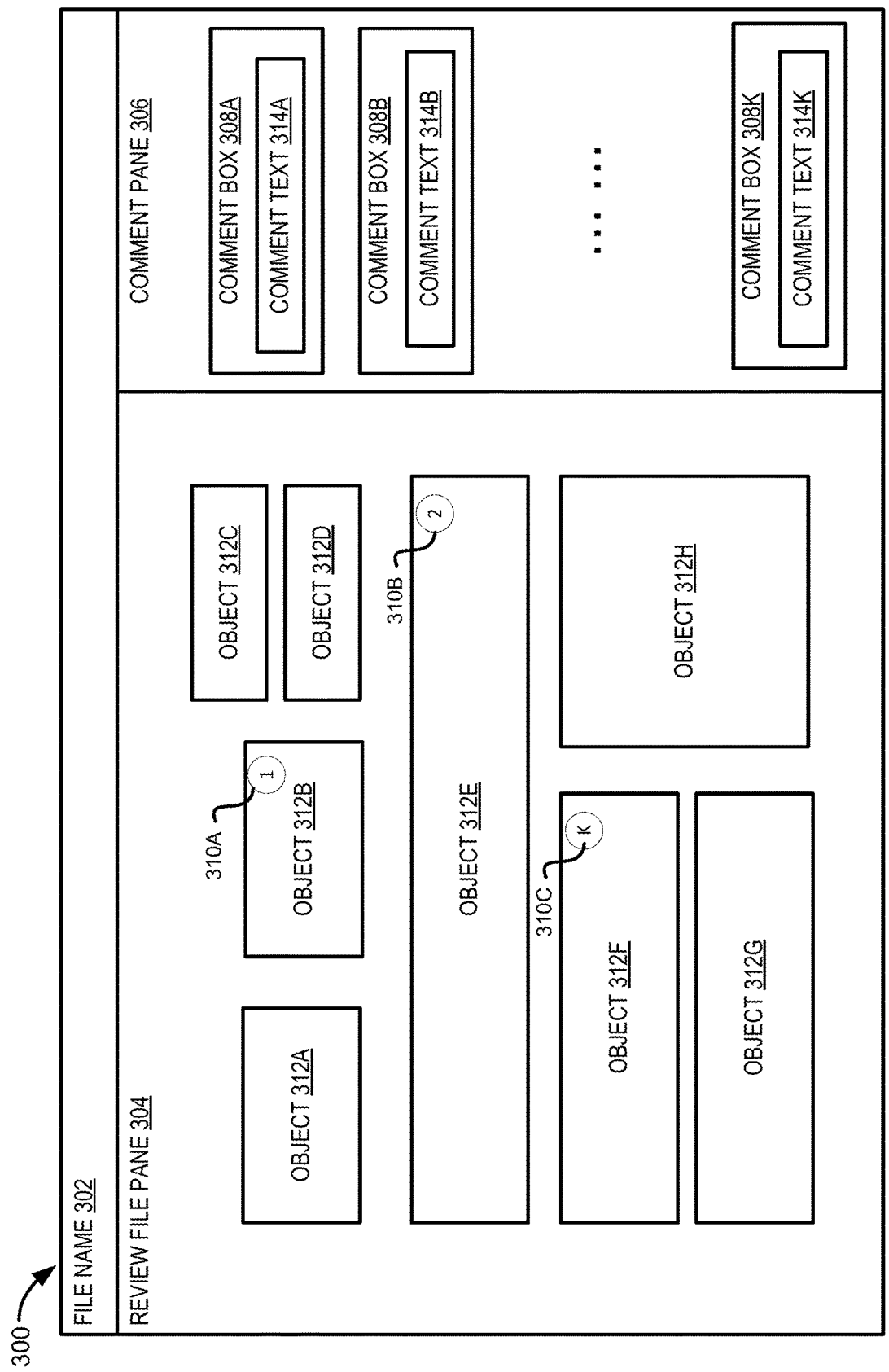
FIG. 3 depicts an example of a user interface of a review application for presenting a review file and the associated comments, according to certain embodiments of the present disclosure.

The review application 104 presents the review application 104 along with the comment 120 in a user interface. FIG. 3 shows an example user interface (UI) 300 of the review application 104. The UI 300 shown in FIG. 3 includes a file name field 302 showing the file name of the review file 114. The UI 300 further includes a review file pane 304 for presenting the content of the review file 114. In this example, the review file 114 contains multiple objects 312A-312H (which may be referred to herein individually as an object 312 or collectively as the objects 312). Each object 312 can be a text object, a visual object (e.g., an image or a button), or a combination thereof (e.g., a button having associated text).

The UI 300 further includes a comment pane 306 configured for presenting the comments 120 added to the review file 114. The comments pane 306 shown in FIG. 3 includes multiple comment boxes 308A-308K and each of the comment boxes 308A-308K is configured to show information associated with a comment, such as the content of the comment, the author of the comment and the time when the comment was added. The comment texts 314A-314K shown in FIG. 3 represent the content of the respective comments. Each of the comment boxes 308A-308K is associated with an object 312 in the review file 114 and the comment text shown in the comment box is directed to such an object. For example, the comment box 308A is associated with object 312B, the comment box 308B is associated with object 312E, and comment box 308K is associated with object 312F. The association between a comment box (and thus the comment text) and an object is indicated using a reference, such as the anchors 310A-310K shown in FIG. 3.

Figure 5:
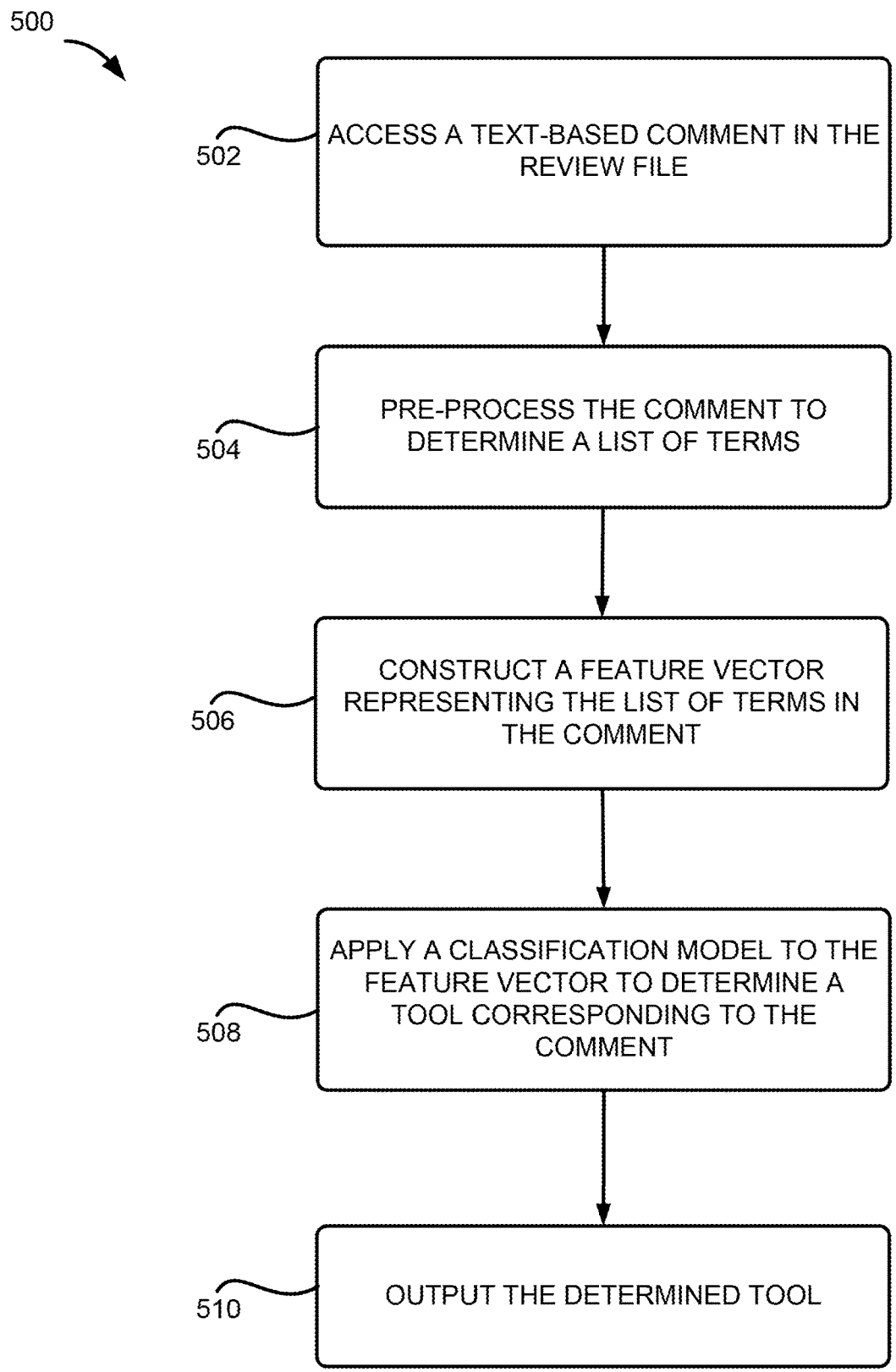
FIG. 5 depicts an example of a process for determining a tool for changing an object in the design file according to a comment in the review file that is associated with the object, according to certain embodiments of the present disclosure.

Referring back to FIG. 2, at block 204, the process 200 involves determining, from the comment 120 associated with an object in the review file 114 (and thus the corresponding object in the design file 112), a tool that can be used to implement the change to the object. In some examples, the determination is made using a classification model. The classification model is trained to accept a feature vector as an input and output a tool of the design application 106 that corresponds to the feature vector. The review application 104 constructs the feature vector by parsing the text in the comment 120 to identify words or phrases contained in the comment 120 and constructing the feature vector using these words or phrases. The tool output by the classification model can be utilized as the tool for implementing the change described in the comment 120. Additional details on determining the tool for the comment 120 are presented herein with regard to FIG. 5. In some embodiments, one or more operations of block 204, such as the operations described herein with respect to FIG. 5, are used to implement a step for generating a user interface that includes the text-based comment and an interface element for activating a tool in a design application that implements the change.

At block 206, the process 200 involves retrieving a package for the tool 118 determined by the classification model 130 and updating the user interface of the review application 104 to include a user interface of the determined tool. To retrieve the tool package, the review application 104 communicates with the design application 106 or a computing device hosting the design application 106 to request the package of the tool 118, such as through an application programming interface ("API") exposed by the design application 106. The package of the tool 118 includes, for example, the software code configured to implement the functionality of the tool 118 and the user interface (UI) files used to present the tool 118. The review application 104 executes the retrieved tool package and presents the UI of the tool 118 by updating the user interface of the review application 104 to show the UI of the tool 118 in conjunction with the comment 120.

Figure 4:
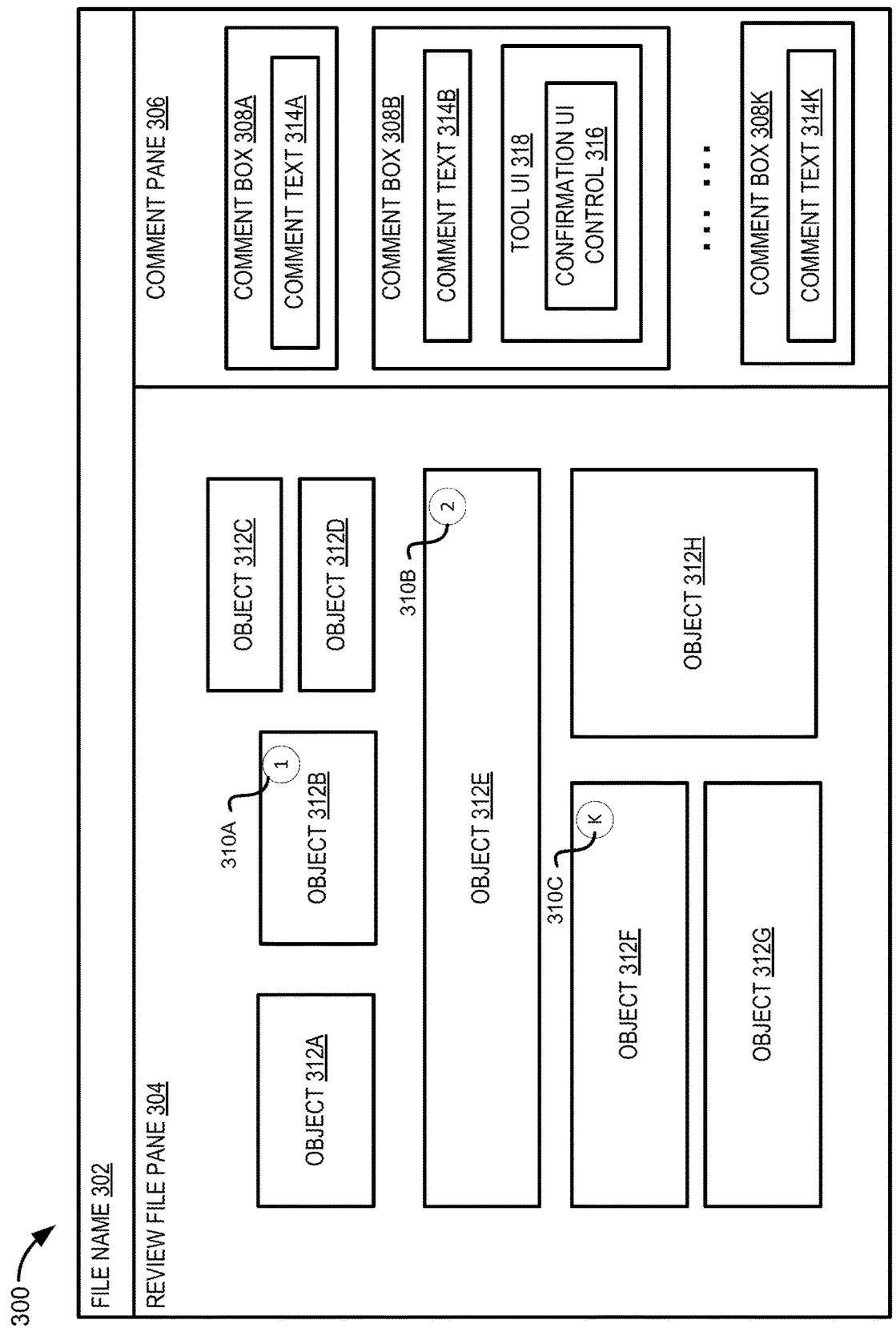
FIG. 4 depicts an example of the user interface shown in FIG. 3 after incorporating a tool identified based on a comment, according to certain embodiments of the present disclosure.

FIG. 4 shows an example of the updated user interface for UI 300 shown in FIG. 3. In the example shown in FIG. 4, the comment shown in comment text 314B is analyzed by the review application 104 to determine an associated tool. The review application 104 further updates the UI 300 to include a user interface for the tool, shown as tool UI 318, in the comment box 308B. The tool UI 318 enables the designer of the design file 112 to modify object 312E according to the comment shown in comment text 314B using the tool presented in the tool UI 318. The tool UI 318 further includes a confirmation UI control 316 (e.g., an "apply" button) that, when activated, causes the change made through the tool UI 318 to be applied to object 312E in the design file 112. In some embodiments, one or more operations of block 206 are used to implement a step for generating a user interface that includes the text-based comment and an interface element (e.g., the UI of the tool) for activating a tool in a design application that implements the change.

Referring back to FIG. 2, at block 208, the process 200 involves receiving confirmation of applying the change to the object in the design file 112. The confirmation can be received, for example, through UI of the tool presented in the UI of the review application 104, such as the confirmation UI control 316 shown in FIG. 3. The object, to which the change is to be applied, is determined as the object pointed to by the reference associated with the comment, such as the anchor 310. Alternatively, or additionally, if the name of the object is mentioned in the comment, the object can be determined by analyzing the text of the comment. In some examples, block 208 is used to implement a step for receiving, through the element for activating the tool, a confirmation of applying the change to the object in the design file.

At block 210, the process 200 involves the review application 104 causing the change to be applied to the object in the design file 112. In some examples, the review application 104 accesses the design file 112 in the datastore 110 and updates the design file 112 based on the change. Alternatively, or additionally, the review application 104 can send the change made through the UI of the tool in the review application 104 to a computing device configured to manage the design file 112 and request that computing device update the design file 112 with the change. In some examples, block 210 is used to implement a step for causing the change to the object to be applied to the design file.

Referring now to FIG. 5, where an example of a process 500 for determining a tool for changing an object in the design file according to a comment in the review file that is associated with the object is presented. The process 500 can be utilized to implement block 204 shown in FIG. 2. One or more computing devices (e.g., the designer computing system 102) implement operations depicted in FIG. 5 by executing suitable program code (e.g., the review application 104). For illustrative purposes, the process 500 is described with reference to certain examples depicted in the figures. Other implementations, however, are possible.

At block 502, the process 500 involves the review application 104 accessing a text-based comment in the review file 114. At block 504, the process 500 involves the review application 104 pre-processing the text in the comment to generate a list of terms contained in the comment. The list of terms can include single words or multi-word phrases. In some examples, the pre-processing includes a tokenization process to parse the sentences in the comment into single words. For example, for a comment containing "Color of the button is way too bright, reducing the brightness would look fine," the tokenization process would produce the following output:

["Color", "of", "the", "button", "is", "way", "too", "bright", "reducing", "the", "brightness", "would", "look", "fine"]

The pre-processing further includes a lemmatization process to apply stemming on each of the words identified in the tokenization process. The lemmatization process reduces each word to its base form. For instance, the word "giving" is reduced to its base form "give" and the word "reducing" is reduced to its base form "reduce." The lemmatization process enables duplicate words to be removed from the list of words identified above, thereby reducing the number of words to be included in the list of terms. Continuing the above example, the output of the lemmatization process is:

["Color", "of", "the", "button", "is", "way", "too", "bright", "reduce", "the", "bright", "would", "look", "fine"].

Here, the word "reducing" is changed to "reduce" and the word "brightness" is changed to "bright."

In further examples, the pre-processing also includes a stop-word removal process. This process involves removing common words (also referred to herein as "stop words") from the tokenized or lemmatized list of words because these stop words do not contribute much to the semantic meaning of the sentence in the comment. The list of stop words can be pre-determined to include mostly used words such as "this," "that," and "is" in English. The list of stop words can also include other words depending on the type of content in the design file. The list of stop words may be updated to include more or fewer stop words based on the tool prediction results. In the above example, if the list of stop words include "of," "the," "too," and "is," the list of terms output by the stop-word removal process becomes:

["Color", "the", "button", "way", "bright", "reduce", "bright", "would", "look", "fine"].

In some examples, the list of terms identified from the comment also includes n-grams. n-grams of a sentence include all possible phrases containing n words. In the above example where the comment includes "Color of the button is way too bright, reducing the brightness would look fine," the 2-grams include the following:

[("Color", "of"), ("of", "the"), ("the", "button"), ("button", "is"), ("is", "way"), ("way", "too"), ("too", "bright"), ("bright", "reducing"), ("reducing", "the"), ("the", "brightness"), ("brightness", "would"), ("would", "look"), ("look", "fine")]

In one example, the list of terms generated at block 504 includes single-word terms and bi-gram (i.e., two-word phrases) identified from the comment.

At block 506, the process 500 involves constructing a feature vector representing the list of terms in the comment. The feature vector is generated for a classification model 130 configured to predict a tool 118 corresponding to the comment based on an input vector built using the comment. In some examples, the feature vector is constructed depending on the type of terms contained in the list of terms, and one sub-vector is constructed for each type of terms. For example, if the list of terms includes both single-word terms and bi-grams, two sub-vectors are constructed.

To construct the sub-vectors, for each term in each type, a term frequency-inverse document frequency (TF-IDF) is calculated. The term frequency (TF) of a term X measures how frequently the term occurs in a document (e.g., the comment in this case). The TF is defined as $$TF(``X") = \frac{\text{Number of times ``}X\text{'' occurs in the document}}{\text{total number of words in the document}}. \quad (1)$$

For example, in the comment "make this button brighter," the TF for the term "make" is ¼=0.25. The inverse document frequency (IDF) of a term X measures the importance of the term X in a document set. The IDF reduces the weight of terms that occur very frequently in the document set and is defined as $$IDF(X) = \log \frac{\text{Total number of documents}}{\text{Number of documents with ``}X\text{'' in it}}. \quad (2)$$

As can be seen from Eqn. (2), the IDF increases the weight of terms that occur rarely in the document set. In the context of tool determination as presented here, the document set includes the sample comments in the training data of the classification model and one sample comment is one document specified in Eqn. (2). Continuing with the above example, if the training data contains 10,000 sample comments and 1,000 of them include the term "make," the IDF of "make" is log (10000/1000)=1. Hence, the TF-IDF score of the term "make" is 0.25×1=0.25. Note that the term described above can be a single word term or an n-gram.

In some examples, the IDF is pre-calculated for each term in a vocabulary and the TF is calculated for the terms contained in the list of terms for a comment when the comment is being processed. The vocabulary can be built to include all the terms in the training data of the classification model. The vocabulary can include single words and n-grams in the sample comments of the training data.

With the TF-IDF for each term, the sub-vector for single-word terms is constructed to have the same number of elements as the number of single words in the vocabulary. The values of the elements in the sub-vector indicate the presence (value "1") or absence (value "0") of the corresponding vocabulary terms in the current comment. In other words, the sub-vector for signal words is $V_1=[s_1, s_2, \ldots, s_N]$, where N is the number of single words in the vocabulary and $s_i=0$ if the i-th vocabulary word is not present in the current comment and $s_i=1$ if the i-th vocabulary word is present in the current comment. The sub-vector $V_1$ is further updated by weighing each non-zero element with the corresponding TF-IDF score. That is, $V_1=[s_1 \times \alpha_1, s_2 \times \alpha_2, \ldots, s_N \times \alpha_N]$ where $\alpha_i$ is the TF-IDF score of the i-th vocabulary word. If a vocabulary word is not present in the current comment under examination, its corresponding value is 0.

The sub-vector for the bigram can be similarly constructed. For example, the sub-vector is constructed as $V_2=[b_1 \times \beta_1, b_2 \times \beta_2, \ldots, b_M \times \beta_M]$, where M is the number of bigrams in the vocabulary, and $\beta_i$ is the TF-IDF of the i-th bigram in the vocabulary. $b_i$ indicates the presence of the i-th bigram in the current comment with 1 indicating presence and 0 indicating absence. The feature vector is constructed by concatenating the sub-vector for the single words and the sub-vector for the bigrams. Although the examples here focus on building the feature vector using single words and bigrams, the feature vector may be built using single words alone or bigram alone. The feature vector may also be built using other combinations of types, such as single words with 3-grams, bigrams with 3-grams, single words, bigrams and 3-grams, or 3-grams alone.

At block 508, the process 500 involves applying the classification model 130 to the feature vector to determine a tool 118 corresponding to the comment 120. The classification model 130 can be a machine learning model such as a multinomial logistic regression model, a decision tree, or a neural network model. The classification model 130 can be trained using the training data mentioned above to output a tool for a given input feature vector. At block 510, the process 500 involves outputting the determined tool.

Process 500 described above applies to one comment. If there are multiple comments in the review file 114, the process 500 is repeated for each of these comments to retrieve the respective tools. Further, if one comment mentions more than one change to an object, the comment is split, such as during the pre-processing process in block 504, into multiple comments each describing one change. The review application 104 performs blocks 506 and 508 for each of these split comments to identify the multiple tools. In addition, although the above examples focus on comments written in English, the technologies described above apply to comments written in other languages as well.

Figure 6:
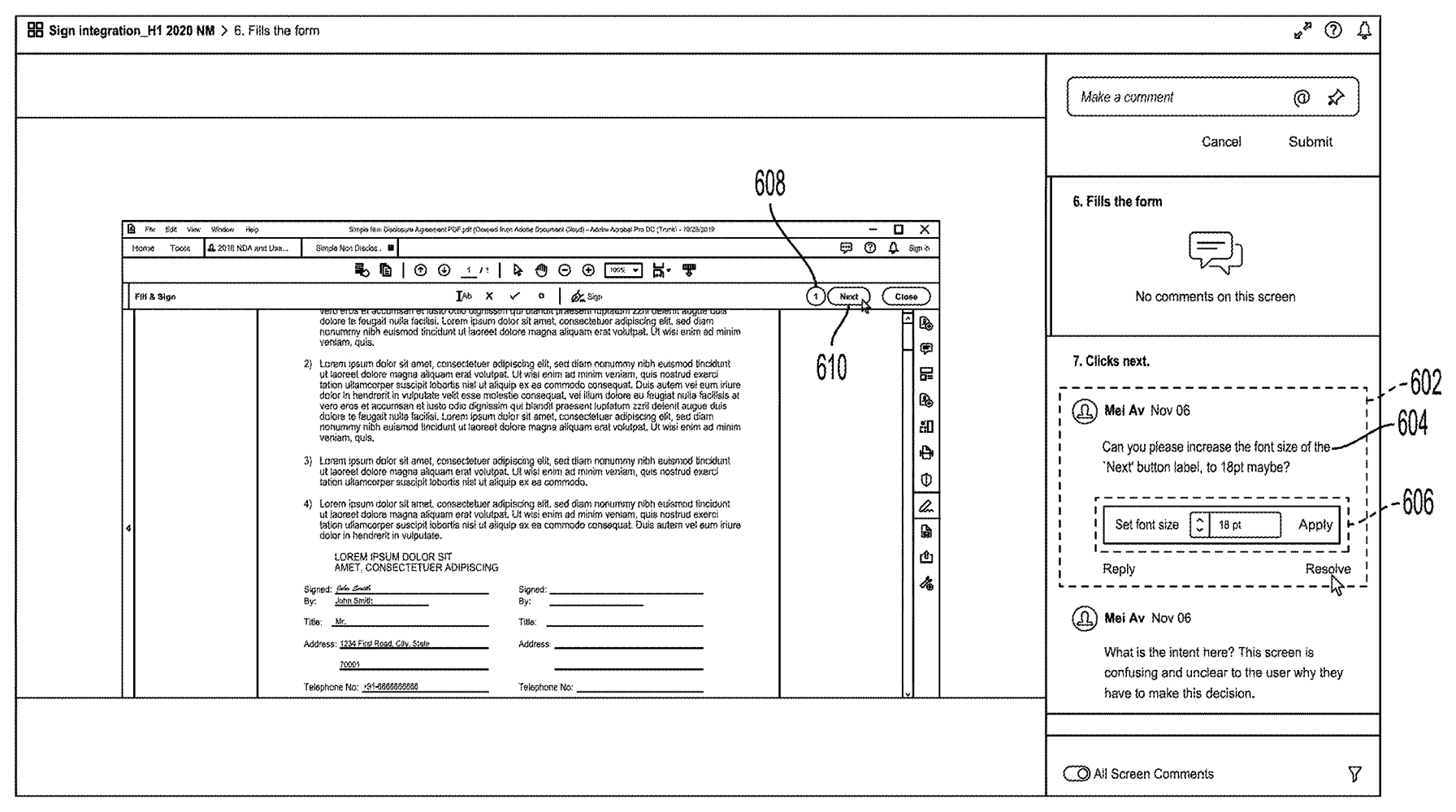
Figure 7:
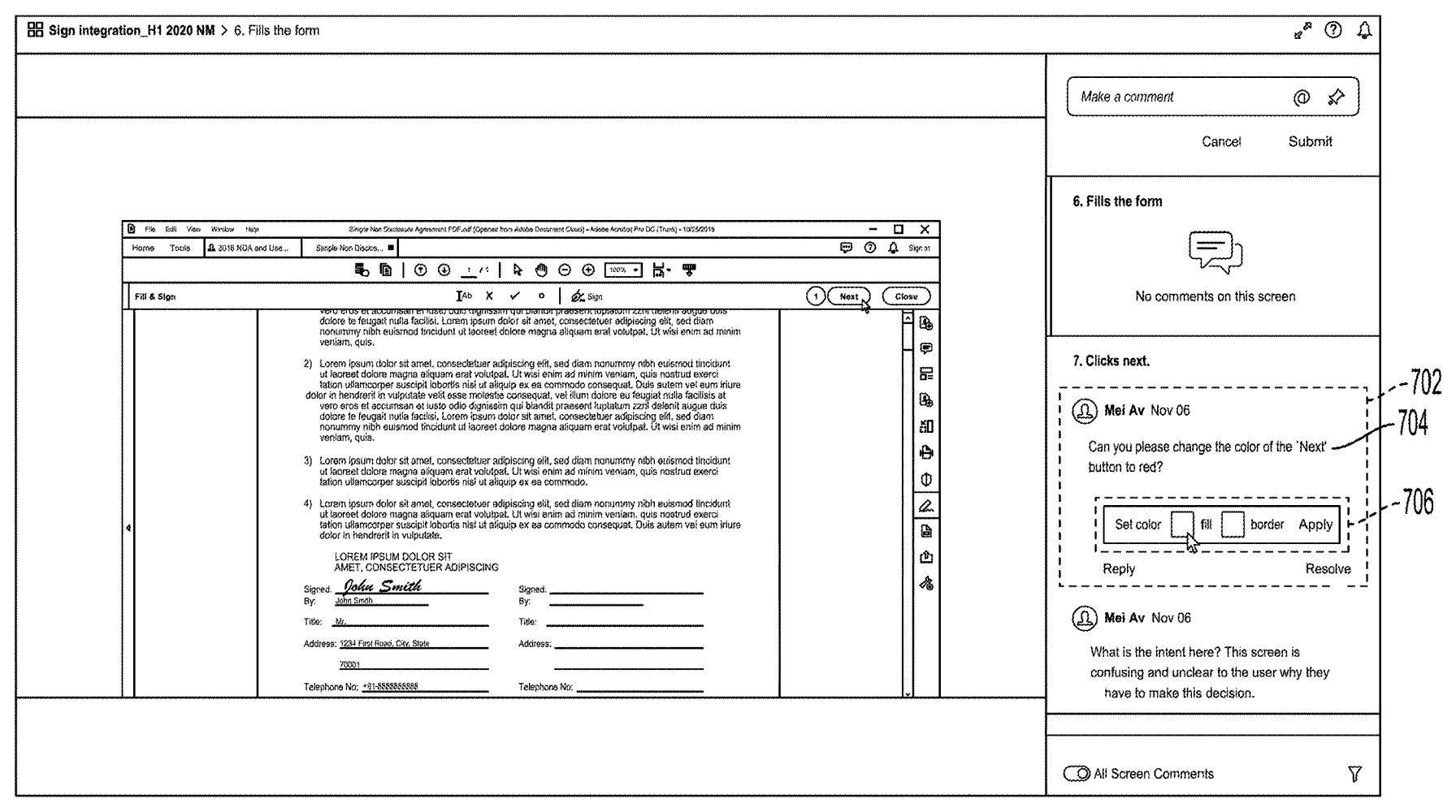
Figure 8:
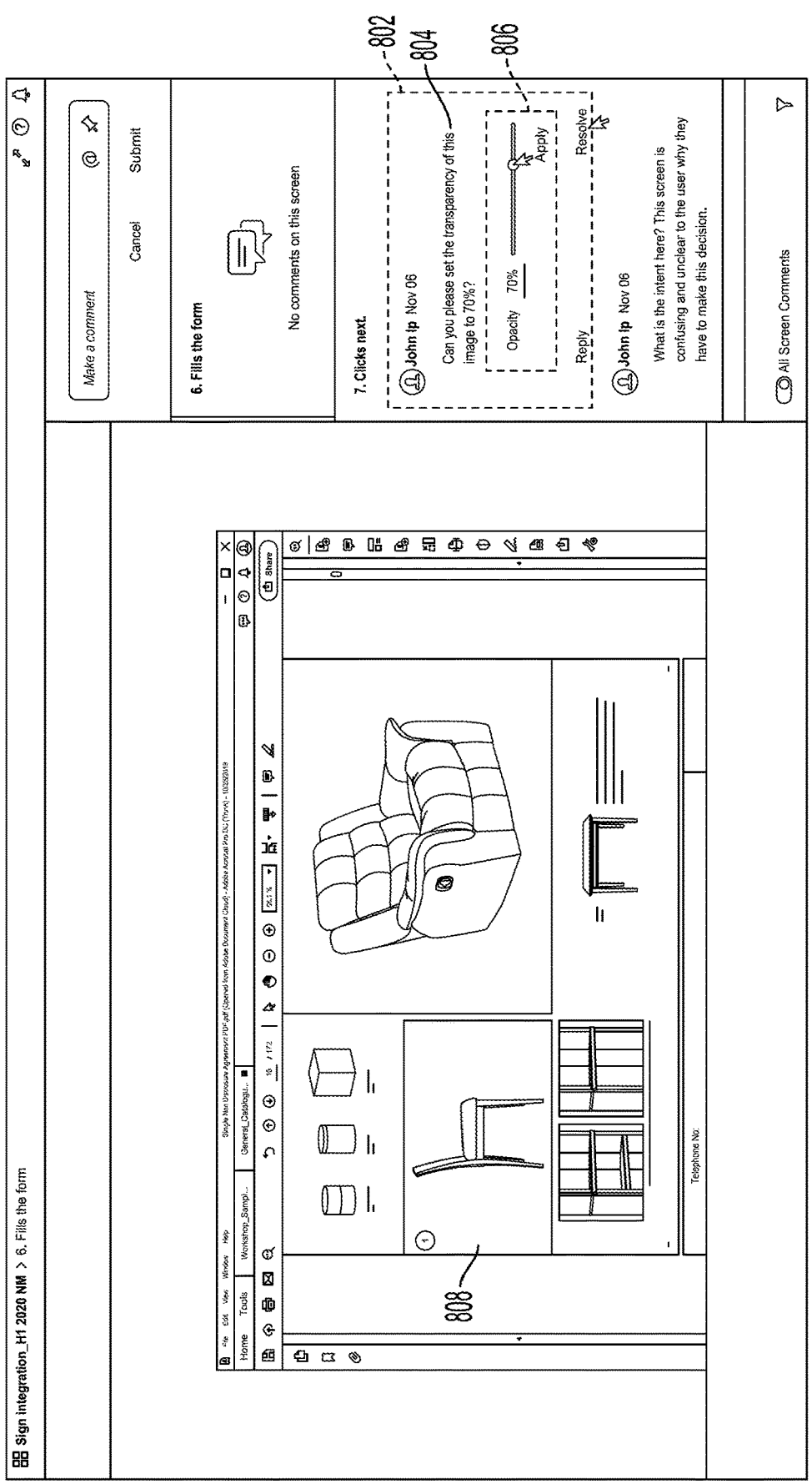
FIG. 8 depicts yet another example of a user interface of a review application for presenting a review file, the associated comments, and a tool identified for a comment, according to certain embodiments of the present disclosure.

FIGS. 6-8 depicts several examples of the user interface of the review application 104 for presenting a review file 114, the associated comments 120, and a tool 118 identified for a comment 120, according to certain embodiments of the present disclosure. The examples depicted in FIGS. 6-8 illustrate a user interface that includes the text-based comment and an interface element for activating a tool in a design application that implements the change. In the example shown in FIG. 6, the comment box 602 shows both the text of the comment 604 and the user interface 606 of the tool identified based on the comment 604. In particular, the comment 604 describes that the font size of the label for the "Next" button 610 should be increase to 18 pt. An anchor 608 is shown next to the "Next" button 610 to indicate that the comment 604 is directed to this button. By analyzing the comment 604 as described above, the review application 104 determines that the related tool 118 is a font size tool and thus presents an interface element, such as the UI 606 of the font size tool, in the comment box 602. The designer can use this font size tool to change the font size of the "Next" button label to 18 pt as suggested in the comment 604. The button "Apply" in the UI 606 enables the designer to confirm the change to be made to the corresponding design file 112. The technologies presented herein improve the user interface of the review application in that it integrates the UI of the tool used to implement the change. As a result, the designer can make the change to the design file, such as changing the font size of the "Next" button, using the UI of the review application without launching the design application, opening the design file and searching around for the tool in the design application.

In some examples, the parameter shown in the tool UI, such as the font size shown in UI 606, is set to the current value of the object according to the design file. For example, if the current font size of the "Next" button is 17 pt., the font size in the tool UI 606 is set to 17 pt. when the tool UI is presented. In this way, the designer can know the value of the object parameter before the change. In other examples, the parameter shown in the tool UI is set to the value recommended in the comment. For example, the font size in the UI 606 is automatically set to 18 pt. according to suggestion in the comment 604 thereby saving one operation of the designer.

In the example shown in FIG. 7, the comment 704 requests the color of the "Next" button to be changed to red. As such, an interface element, such as a color tool UI 706, is presented in the comment box 702 along with the comment 704 to enable the designer to change the color of the "Next" button. FIG. 8 shows a comment 804 requesting a change to the transparency of an image object. Based on this comment, the review application 104 presents an interface element, such as a transparency tool 806, in the comment box 802 to allow the designer to change the transparency of the image object 808 within the review application 104.

Although the above description focuses on implementing the changes specified in the text-based comments inside the review application 104, the same functionality can be added to the design applications 106. As a result, the design application can be configured to present the tools required to implement the changes in the comments along with the comments in the user interface of the design application. The designer can use the presented tools to implement the changes to the design file without browsing through the menus of the design application to search for the right tools.

More specifically, the designer can open the review file 114 using the design application 106 to view the comments added to the review file 114. (If needed, the design application 106 can be modified to support the viewing of the comments in the review file 114.) Depending on the user interface design of the design application 106, the design application may present the comments in a comment pane along with a user interface area showing the content of the review file 114 or the design file 112. The design application 106 can further analyze the texts in each of the comments, for example by using the process described in FIG. 5, to determine the right tool for implementing the changes specified in the comment. The design application 106 can update its user interface to present the determined tool next to the comment in the comment pane. As such, the designer can use the tool presented along with the comment to implement the change to the design file, instead of navigating through the menus of the design application 106 to search for the right tool. In response to receiving a confirmation through the presented tool, the design application 106 can apply the changes to the design file 112 and update the content shown in the user interface accordingly.

Figure 9:
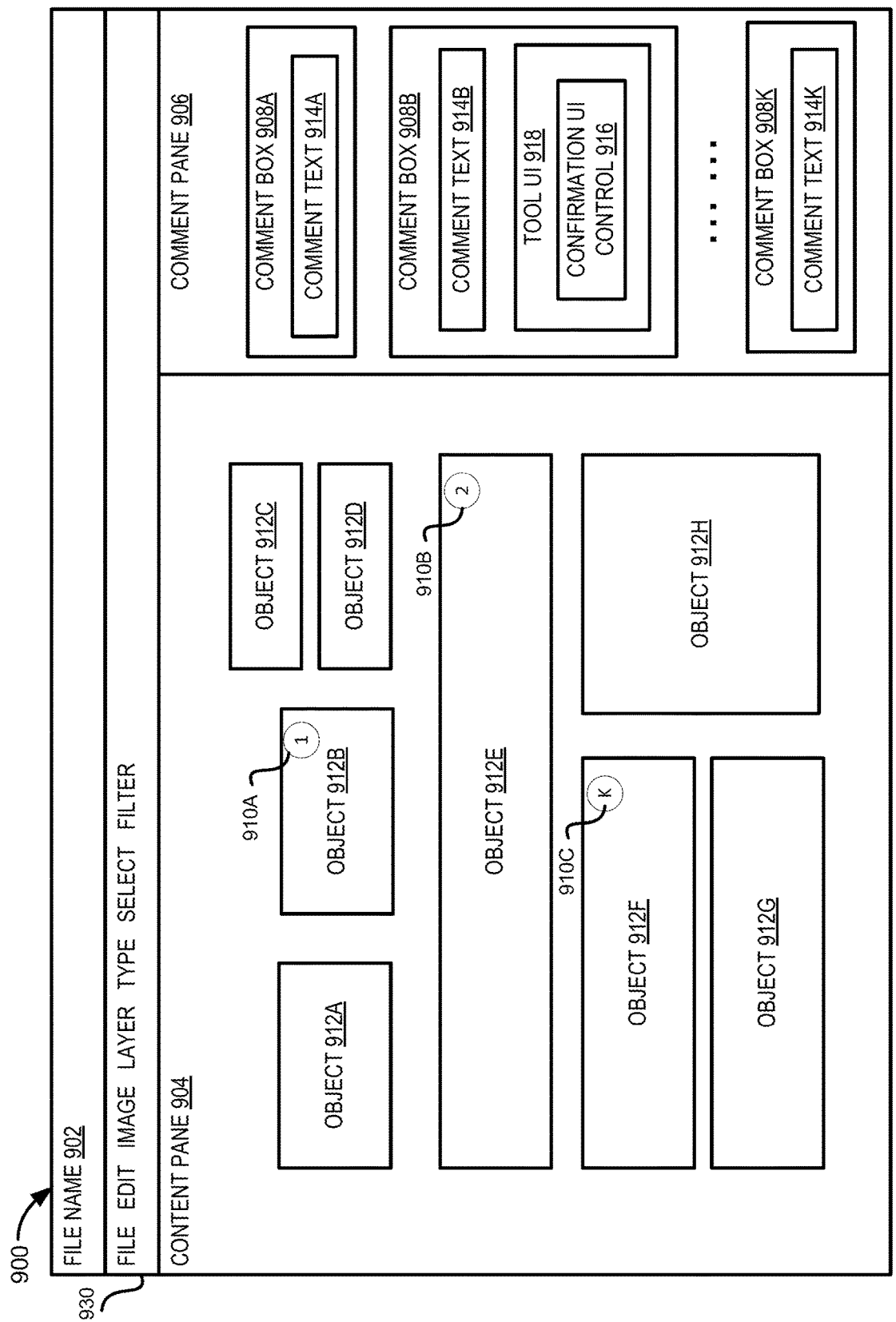
FIG. 9 depicts an example of a user interface of a design application for presenting a review file and the associated comments as well as tools extracted based on the comments, according to certain embodiments of the present disclosure.

FIG. 9 shows an example of a user interface 900 of a design application for presenting tools extracted from comments added to a review file. The example shown in FIG. 9 is similar to the user interface shown in FIG. 4 for the review application and includes a comment pane 906 for presenting the comments and a content pane 904 for presenting the content of the design file or the review file. The difference is that the user interface 900 has a set of menus 930 through which the tools required to implement the changes specified in the comments can be accessed. By implementing the technologies presented herein, these tools can be automatically identified and presented in the tool UI 318 along with the comments thereby increasing the efficiency of the revision process.

Figure 10:
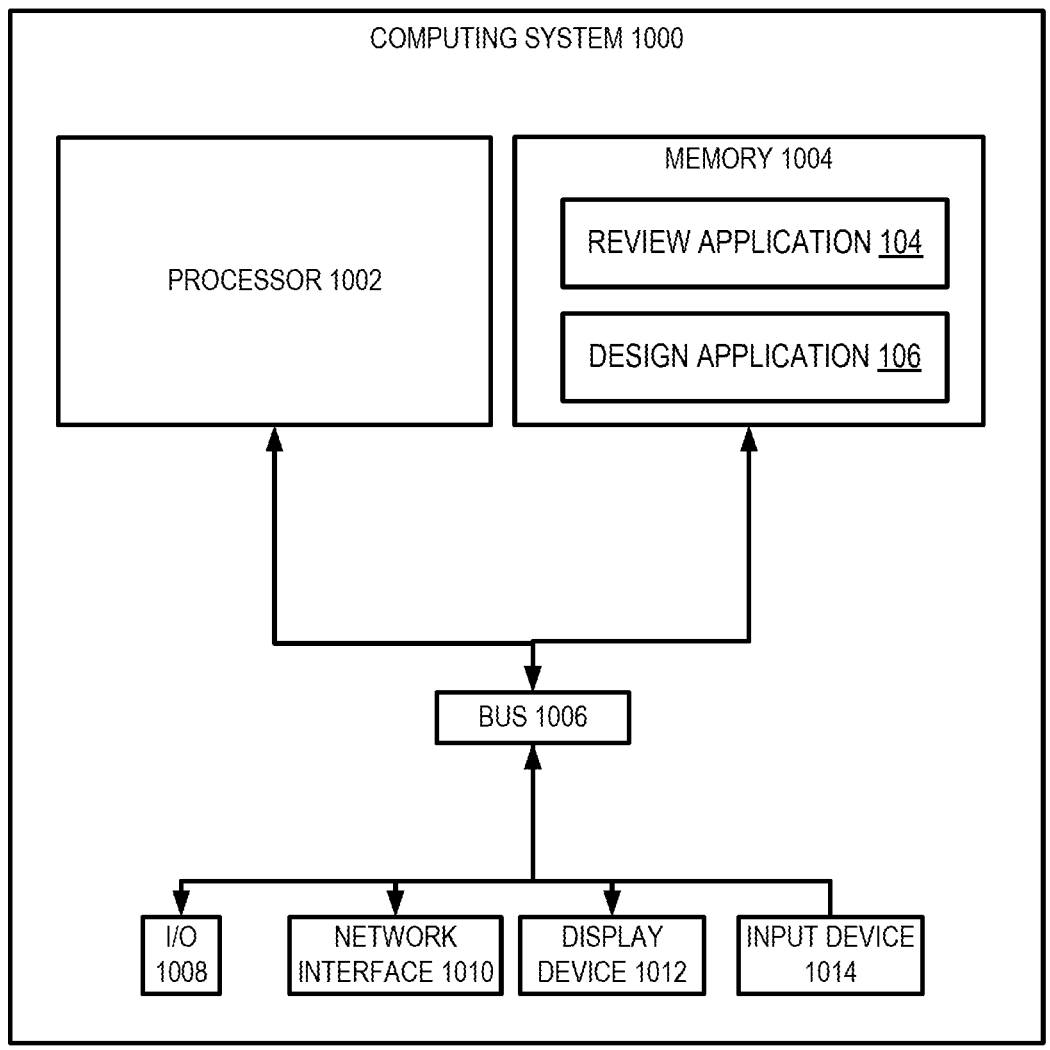
FIG. 10 depicts an example of a computing system that executes a visual content proofing system for performing certain embodiments of the present disclosure.

Computing System Example for Implementing Integrated Review and Revision of Digital Content Any suitable computing system or group of computing systems can be used for performing the operations described herein. For example, FIG. 10 depicts an example of a computing system 1000 that can implement the computing environment of FIG. 1. In some embodiments, the computing system 1000 includes a processing device 1002 that executes the review application 104 or the design application 106, a memory that stores various data computed or used by the review application 104 or the design application 106, an input device 1014 (e.g., a mouse, a stylus, a touchpad, a touchscreen, etc.), and a display device 1012 that displays graphical content generated by the review application 104 or the design application 106. For illustrative purposes, FIG. 10 depicts a single computing system on which the review application 104 or the design application 106 is executed, and the input device 1014 and display device 1012 are present. But these applications, datasets, and devices can be stored or included across different computing systems having devices similar to the devices depicted in FIG. 10.

The depicted example of a computing system 1000 includes a processing device 1002 communicatively coupled to one or more memory devices 1004. The processing device 1002 executes computer-executable program code stored in a memory device 1004, accesses information stored in the memory device 1004, or both. Examples of the processing device 1002 include a microprocessor, an application-specific integrated circuit ("ASIC"), a field-programmable gate array ("FPGA"), or any other suitable processing device. The processing device 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as an input device 1014, a display device 1012, or other input or output devices. For example, the computing system 1000 is shown with one or more input/output ("I/O") interfaces 1008. An I/O interface 908 can receive input from input devices or provide output to output devices. One or more buses 1006 are also included in the computing system 1000. The buses 1006 communicatively couples one or more components of a respective one of the computing system 1000.

The computing system 1000 executes program code that configures the processing device 1002 to perform one or more of the operations described herein. The program code includes, for example, the review application 104, the design application 106, or other suitable applications that perform one or more operations described herein. The program code may be resident in the memory device 1004 or any suitable computer-readable medium and may be executed by the processing device 1002 or any other suitable processor. In some embodiments, all modules in the review application 104 or the design application 106 are stored in the memory device 1004, as depicted in FIG. 10. In additional or alternative embodiments, one or more of these modules from the review application 104 or the design application 106 are stored in different memory devices of different computing systems.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., a computing device that receives inputs for the review application 104 or the design application 106 or displays outputs of the review application 104 or the design application 106) via a data network using the network interface device 1010.

An input device 1014 can include any device or group of devices suitable for receiving visual, auditory, or other suitable input that controls or affects the operations of the processing device 1002. Non-limiting examples of the input device 1014 include a touchscreen, stylus, a mouse, a keyboard, a microphone, a separate mobile computing device, etc. A display device 1012 can include any device or group of devices suitable for providing visual, auditory, or other suitable sensory output. Non-limiting examples of the display device 1012 include a touchscreen, a monitor, a separate mobile computing device, etc.

Although FIG. 10 depicts the input device 1014 and the display device 1012 as being local to the computing device that executes the review application 104 or design application 106, other implementations are possible. For instance, in some embodiments, one or more of the input device 1014 and the display device 1012 can include a remote client-computing device that communicates with the computing system 1000 via the network interface device 1010 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:
    accessing, by a review application, a review file containing a text-based comment describing a change to an object in a design file, wherein the design file is created and editable in a design application different from the review application;
    determining, from the text-based comment, a tool in the design application configured to implement the change to the object described in the text-based comment, wherein determining the tool from the text-based comment comprises:
        constructing a feature vector for the text-based comment based on a list of terms contained in the text-based comment, and
        determining the tool based on the feature vector,
        wherein constructing the feature vector comprises combining frequencies of terms in the list of terms, importance of the terms in the list of terms, and presence of individual terms of a vocabulary in the list of terms;
    updating a user interface of the review application to include a user interface of the tool along with the text-based comment;
    receiving, through the user interface of the tool, a confirmation of applying the change to the object in the design file; and
    causing the change to the object to be applied to the design file.

2. The computer-implemented method of claim 1, wherein determining the tool based on the feature vector comprises applying a classification model to the feature vector to determine the tool.

3. The computer-implemented method of claim 2, wherein the vocabulary comprises a vocabulary generated from a training set of the classification model, and wherein constructing a feature vector for the text-based comment using the list of terms further comprises:
determining the frequencies of the terms by calculating term frequencies for the terms, respectively;
determining the importance of the terms by calculating inverse term frequencies for the terms, respectively, using the vocabulary; and
determining the presence of the individual terms of the vocabulary in the list of terms by generating a vector indicating the presence of the individual terms of the vocabulary in the list of terms.

4. The computer-implemented method of claim 3, wherein constructing the feature vector further comprises:
generating a list of phrases, each phrase in the list of phrases containing at least two terms in the list of terms;
calculating additional term frequencies for the phrases;
calculating additional inverse term frequencies for the phrases, respectively, using the vocabulary generated from the training set of the classification model;
generating an additional vector indicating presence of individual phrase of the vocabulary in the list of phrases; and
generating the feature vector by at least combining the term frequencies, the additional term frequencies, the inverse term frequencies, the additional inverse term frequencies, the vector, and the additional vector.

5. The computer-implemented method of claim 2, wherein the list of terms comprises is generated by:
identifying a set of single words contained in the text-based comment;
revising the set of single words in the text-based comment to respective base forms;
and removing words contained in a predetermined set of words from the set of single words in the text-based comment to generate the list of terms.

6. The computer-implemented method of claim 1, further comprising determining the object for which the change is to be made by one or more of:
identifying the object from the text-based comment; or
determining the object using a reference associated with the text-based comment.

7. The computer-implemented method of claim 1, wherein causing the change to the object to be applied to the design file comprises accessing the design file and modifying the object in the design file according to the change.

8. The computer-implemented method of claim 1, wherein causing the change to the object to be applied to the design file comprises transmitting the change to the object to another computing device configured for modifying the object in the design file according to the change.

9. The computer-implemented method of claim 1, wherein the change to the object comprises a change to a parameter of the object and the tool is configured to change the parameter of the object, and wherein updating the user interface of the review application to include a user interface of the tool along with the text-based comment comprises:
updating the user interface of the review application by setting the parameter in the tool to be a value of the parameter of the object before the change; or
updating the user interface of the review application by setting the parameter in the tool to be a value of the parameter of the object after the change.

10. The computer-implemented method of claim 9, wherein the user interface of the tool comprises a first user interface control configured to change the parameter of the object and a second user interface control configured to submit a confirmation of the change to the object.

11. The computer-implemented method of claim 1, wherein the design file comprises a plurality of objects and the review file is generated by rendering the plurality of objects.

12. The computer-implemented method of claim 11, wherein the plurality of objects contained in the design file comprises a visual object.

13. A system comprising:
a processing device; and
a non-transitory computer-readable medium communicatively coupled to the processing device, wherein the processing device is configured to execute program code stored in the non-transitory computer-readable medium and thereby perform operations comprising:
accessing, by a review application, a review file containing a text-based comment describing a change to an object in a design file, wherein the design file is created and editable in a design application different from the review application;
determining, from the text-based comment, a tool in the design application configured to implement the change to the object described in the text-based comment, wherein determining the tool from the text-based comment comprises:
constructing a feature vector for the text-based comment based on a list of terms contained in the text-based comment, and
determining the tool based on the feature vector,
wherein constructing the feature vector comprises combining frequencies of terms in the list of terms, importance of the terms in the list of terms, and presence of individual terms of a vocabulary in the list of terms;
updating a user interface of the review application to include a user interface of the tool along with the text-based comment;
receiving, through the user interface of the tool, a confirmation of applying the change to the object in the design file; and
causing the change to the object to be applied to the design file.

14. The system of claim 13, wherein determining the tool based on the feature vector comprises:
applying a classification model to the feature vector to determine the tool.

15. The system of claim 14, wherein the vocabulary comprises a vocabulary generated from a training set of the classification model, and wherein constructing a feature vector for the text-based comment using the list of terms further comprises:
determining the frequencies of the terms by calculating term frequencies for the terms, respectively;
determining the importance of the terms by calculating inverse term frequencies for the terms, respectively, using a the vocabulary; and
determining the presence of the individual terms of the vocabulary in the list of terms by generating a vector indicating presence of individual terms of the vocabulary in the list of terms.

16. The system of claim 15, wherein constructing the feature vector further comprises:

generating a list of phrases, each phrase in the list of phrases containing at least two terms in the list of terms;

calculating additional term frequencies for the phrases;

calculating additional inverse term frequencies for the phrases, respectively, using the vocabulary generated from the training set of the classification model;

generating an additional vector indicating presence of individual phrase of the vocabulary in the list of phrases; and generating the feature vector by at least combining the term frequencies, the additional term frequencies, the inverse term frequencies, the additional inverse term frequencies, the vector, and the additional vector.

17. The system of claim 14, wherein the list of terms is generated by:

identifying a set of single words contained in the text-based comment;

revising the set of single words in the text-based comment to respective base forms; and removing words contained in a predetermined set of words from the set of single words in the text-based comment to generate the list of terms.

18. A non-transitory computer-readable medium having program code that is stored thereon, the program code executable by one or more processing devices for performing operations comprising:

accessing, by a review application, a review file containing a text-based comment describing a change to an object in a design file, wherein the design file is created and editable in a design application different from the review application;

determining, from the text-based comment, a tool in the design application configured to implement the change to the object described in the text-based comment, wherein determining the tool from the text-based comment comprises:

constructing a feature vector for the text-based comment based on a list of terms contained in the text-based comment, and determining the tool based on the feature vector, wherein constructing the feature vector comprises combining frequencies of terms in the list of terms, importance of the terms in the list of terms, and presence of individual terms of a vocabulary in the list of terms;

updating a user interface of the review application to include a user interface of the tool along with the text-based comment;

receiving, through the user interface of the tool, a confirmation of applying the change to the object in the design file; and causing the change to the object to be applied to the design file.

19. The non-transitory computer-readable medium of claim 18, wherein the operations further comprise determining the object for which the change is to be made by one or more of:

identifying the object from the text-based comment; or determining the object using a reference associated with the text-based comment.

20. The non-transitory computer-readable medium of claim 18, wherein the change to the object comprises a change to a parameter of the object, wherein the tool is configured to change the parameter of the object, and wherein updating the user interface of the review application to include a user interface of the tool along with the text-based comment comprises:

setting the parameter of the tool in the user interface to be a value of the parameter of the object before the change; or setting the parameter of the tool in the user interface to be a value of the parameter of the object after the change.

\* \* \* \* \*